United States Patent [19]

Gonzalez et al.

[11] Patent Number: 5,771,056
[45] Date of Patent: Jun. 23, 1998

[54] DIGITAL IMAGE REPRODUCTION SYSTEM INCLUDING A PROGRAMMABLE SORTER

[75] Inventors: Carlos Gonzalez, Pittsford; Steven H. Cook, Rochester, both of N.Y.

[73] Assignee: Eastman Kodak Company, Rochester, N.Y.

[21] Appl. No.: 415,947

[22] Filed: Apr. 3, 1995

[51] Int. Cl.$^6$ ............................................. B41J 2/47
[52] U.S. Cl. .................................. 347/153; 347/262
[58] Field of Search ................................ 347/262, 264, 347/139, 153; 399/403, 404, 405, 401, 402

[56] References Cited

U.S. PATENT DOCUMENTS

| | | |
|---|---|---|
| D. 254,975 | 5/1980 | Gambrell et al. . |
| 3,744,790 | 7/1973 | Hoffman . |
| 4,011,952 | 3/1977 | Smith et al. . |
| 4,095,782 | 6/1978 | Breuers et al. . |
| 4,141,546 | 2/1979 | Queener . |
| 4,148,475 | 4/1979 | Schulz . |
| 4,299,382 | 11/1981 | Ichikawa . |
| 4,322,069 | 3/1982 | Mitchell . |
| 4,361,321 | 11/1982 | Holliday . |
| 4,370,052 | 1/1983 | Murakami et al. ..................... 399/403 |
| 4,534,643 | 8/1985 | Watanabe . |
| 4,819,931 | 4/1989 | Goto et al. . |
| 4,823,151 | 4/1989 | Miura ..................................... 347/238 |
| 4,849,790 | 7/1989 | Ito . |
| 5,104,117 | 4/1992 | McCormick et al. . |

*Primary Examiner*—Mark J. Reinhart
*Attorney, Agent, or Firm*—William F. Noval

[57] ABSTRACT

A digital image reproduction system includes a sorter which is programmable to store media sheets from a single source of digital images in one or more assigned sorter storage locations. The sorter is controlled to switch from one of the assigned sorter storage locations to another assigned sorter storage location when the one storage location is full or when a predetermined number of media sheets have been placed into the one storage location.

4 Claims, 8 Drawing Sheets

DIGITAL IMAGE REPRODUCTION SYSTEM INCLUDING A PROGRAMMABLE SORTER

FIELD OF THE INVENTION

The invention relates to a digital image reproduction system including a programmable sorter and, more particularly, to a sorter which is programmable to store media sheets from a single source in one or more sorter storage locations.

BACKGROUND OF THE INVENTION

A wide variety of sorting and processing equipment has long been available for use with copier papers and transparencies, photographic films and papers, and other media sheets.

Most sorting equipment is not tightly constrained as to the time required to clear jams or process an interrupting job. Equipment users would prefer that these procedures be quick and easy; but most users do not mind a minute or two of delay, if the procedures are not otherwise unduly burdensome. This is not true for equipment subject to emergency use, such as x-ray processing equipment, where every second may matter. With such equipment, it is desirable to both have sorting apparatus to handle the sorting of routine matters on a regular basis and to have the option to, in effect, very quickly eliminate the sorting apparatus in the event of an emergency.

Laser printers are used in medical diagnostic imaging applications to produce hard copy images which come from devices such as CT, MR, DSA, and US. Typically, more than one device is connected to the laser printer. An optional sorter can be installed on the printer to put films from each device in their own sorter bin. The customer advantage is that, for example, the CT technologist does not need to look through a stack of films to find the films that he/she printed.

A problem exists when the films reproduced from one source exceeds the capacity of the sorter bin assigned to it. The operator is required to empty the bin more frequently, even though the sorter may have unassigned empty bins.

SUMMARY OF THE INVENTION

According to the present invention, there is provided a solution to the problems noted above by means of a technique for placing media sheets (films) in the proper sorter storage location (bin) when a source of images is assigned more than one sorter storage location (bin). In general, according to the present invention, if a sorter has more bins than there are image sources connected to a media sheet printer, more than one bin can be assigned to one or more of the sources. According to a feature of the invention, when a sorter bin is full, or when a certain number of media sheets have been placed into a sorter bin, media sheets from an image source will be placed in the next bin assigned to the image source.

According to the present invention, there is provided a digital image reproduction system comprising:

a plurality of sources of digital images;

a printer connected to said plurality of sources for reproducing digital images on media sheets;

a sorter connected to said printer, said sorter having a plurality of selectable storage locations for storing media sheets output from said printer;

an operator interface connected to said printer and said sorter for selectively assigning two or more storage locations of said sorter for storing media sheets reproducing images from one of said image sources; and a control for controlling said sorter to switch from one of said assigned sorter storage locations to another of said sorter storage locations when said one sorter storage location is full or when a predetermined number of media sheets have been placed into said one storage location.

The present invention has the following advantages, among others.

1. The primary advantage of this invention is that it increases the number of films that may be printed from a source device before an operator must go to the printer and remove the films from a bin; that is, the capacity of a single bin is no longer a constraint.

2. The ability of the operator to program which bin(s) are assigned to each device allows the operator to assign more bins to more heavily-used devices, and fewer bins to devices that print fewer films. This also allows the operator to remove films from the printer less frequently.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 7:
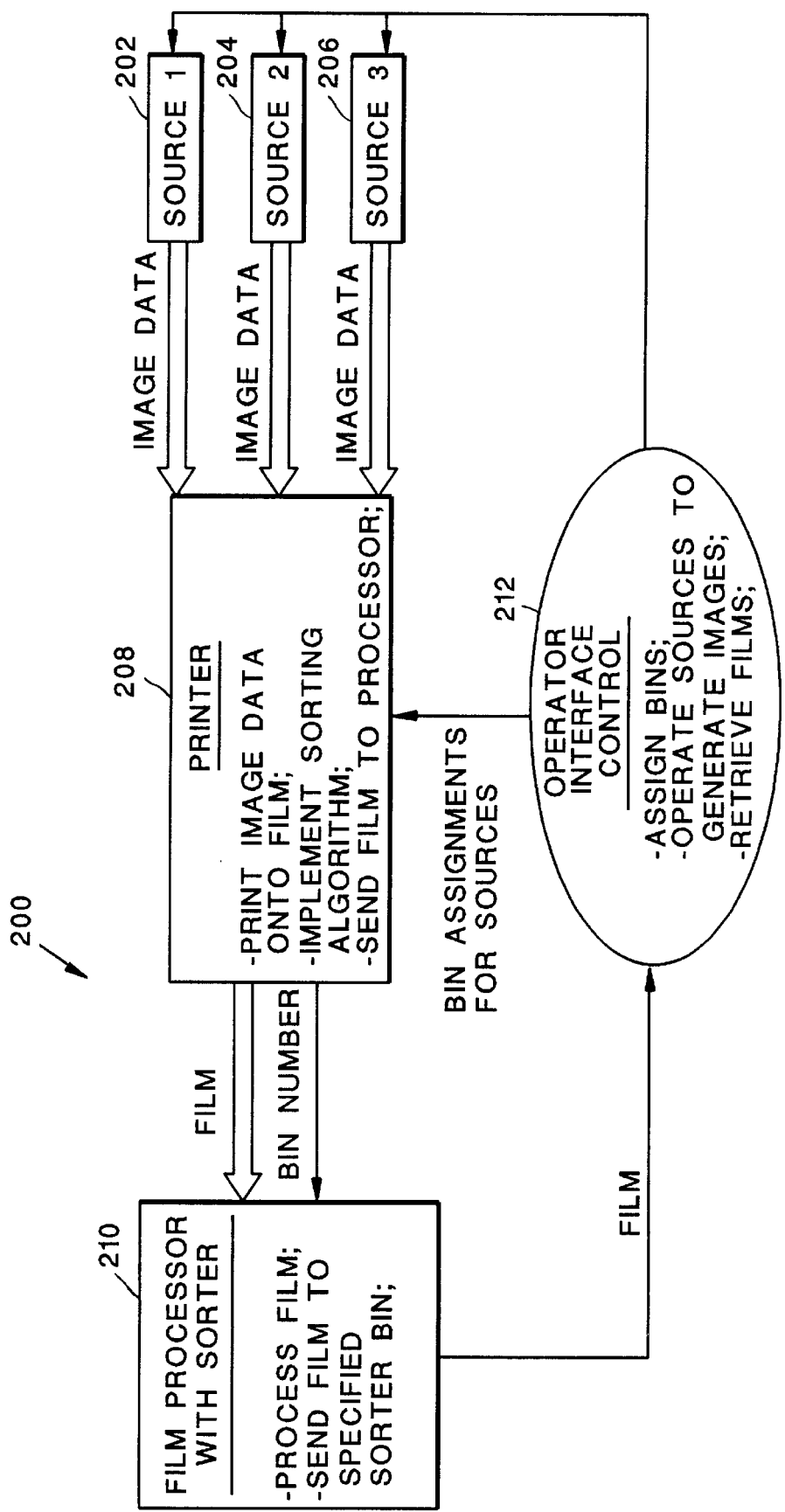
FIG. 7 is a block diagram of a digital image reproduction system incorporating the present invention.

Referring now to FIG. 7, there is shown a block diagram of a digital image reproduction system according to the present invention. Although the system described relates to a medical imaging reproduction system, it will be understood by those skilled in the art that the invention is applicable to other image reproduction systems. As shown, digital image reproduction system 200 includes a plurality of medical image sources, 202,204,206, such as, for example, diagnostic scanners, e.g., MRI, CT, PET, US scanners; storage phosphor reader; film digitizer; medical image archive; image transmission source, e.g., telephone, cable, satellite. Image data from sources 202,204,206 are transmitted to printer 208, such as a radiographic laser printer. Printer 208 prints the image data onto media sheets, such as radiographic film. The radiographic film is sent to a radiographic film processor 210 which processes the film and sends it to a sorter (to be described later). The sorter sends the film to a specified sorter bin.

System 200 includes an operator interface and control 212. The operator can program which bin or bins in the sorter are assigned to each image source 202,204,206.

The printer 208 will place films in the lowest-numbered bin assigned to the source 202,204,206 until, by printer count, the capacity of the bin is reached. Subsequent films will be placed in the next highest-numbered bin assigned to the source until, by printer count, the capacity of that bin is reached. The printer 208 will fill all bins assigned to the device in this manner, and then repeat the cycle starting with the lowest-numbered bin assigned to the device.

For example, assuming that source 202 (e.g., a CT scanner) has been assigned bins 1 and 2,

| bin | gets |
| --- | --- |
| 1 | first 50 films from CT (202) |
| 2 | next 50 films from CT (202) |
| 1 | next 50 films from CT (202) | and so on.

Figure 8:
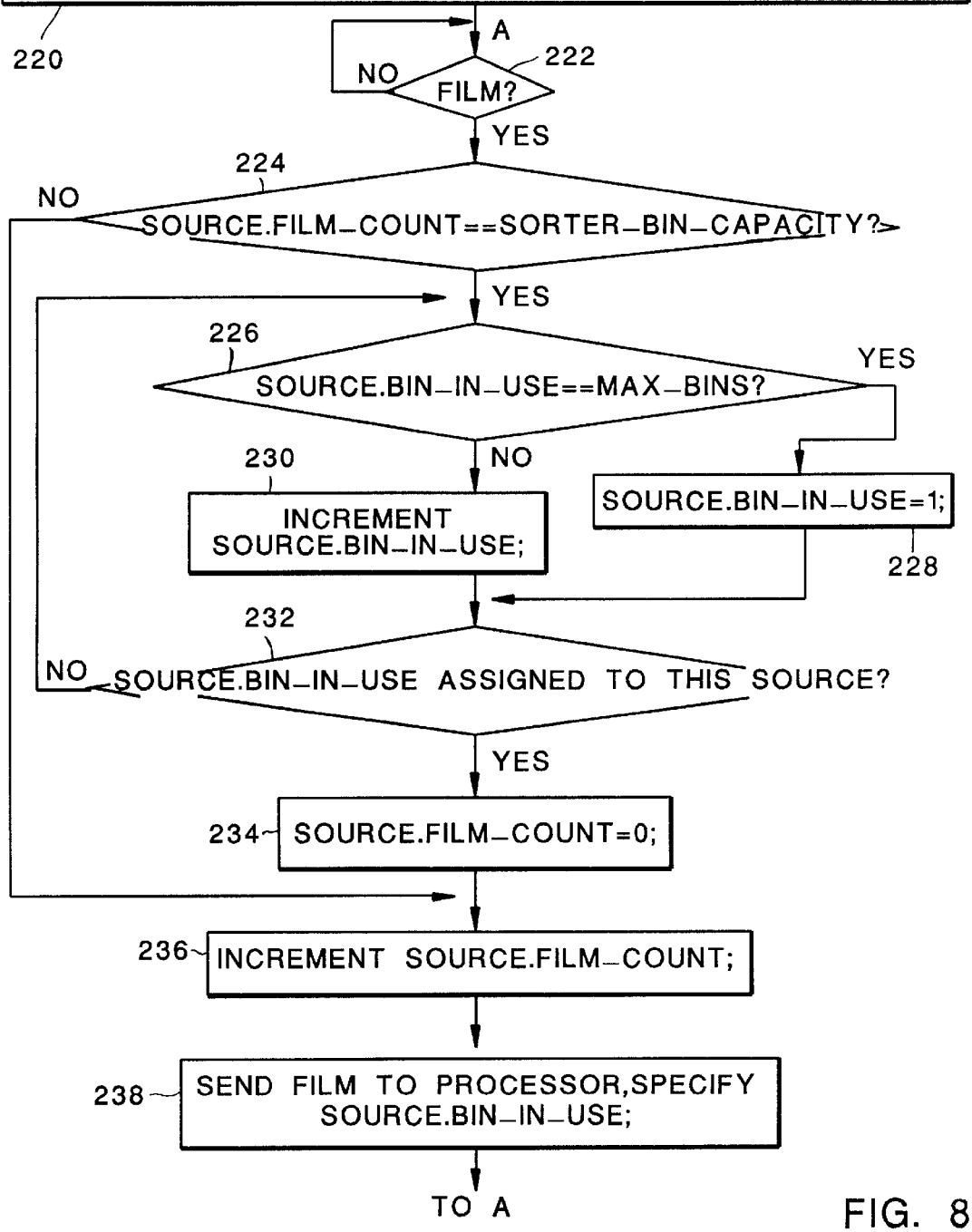
FIG. 8 is a flow diagram showing an implementation of the present invention.

Referring now to FIG. 8, there will be described a flow diagram of an implementation of the present invention. As shown in box 220, at set up the following conditions are set.

source.assignedbins=all bins assigned to source via operator interface dialogue;

source.bininuse=lowest numbered assigned bin;

source.filmcount=0;

maxbins=number of sorter bins (from processor);

sorterbincapacity=bin capacity (from processor);

At decision diamond 222, it is determined if film is present, if no, the routine is returned to the input of diamond 222. If film is present at decision diamond 224, it is determined if "source.filmcount=sorterbincapacity". If no, the routine branches to box 236 and "increment source.film count" is implemented. If yes, at decision diamond 226, it is determined if "source.bininuse=maxbins". If yes, at box 228, "source.bininuse=1" is implemented and the routine continues to decision diamond 232. If no, at box 230, "increment source.bininuse" is implemented.

At decision diamond 232, it is determined if "source.bin inuse assigned to this source". If no, the routine is returned to the input of decision diamond 226. If yes, at box 234, "source.filmcount=0" is implemented; at box 236, "increment source.film count" is implemented; and at box 238 "send film to processor, specify source.bininuse" is implemented. Thereafter, the routine is returned to "A".

Figure 1:
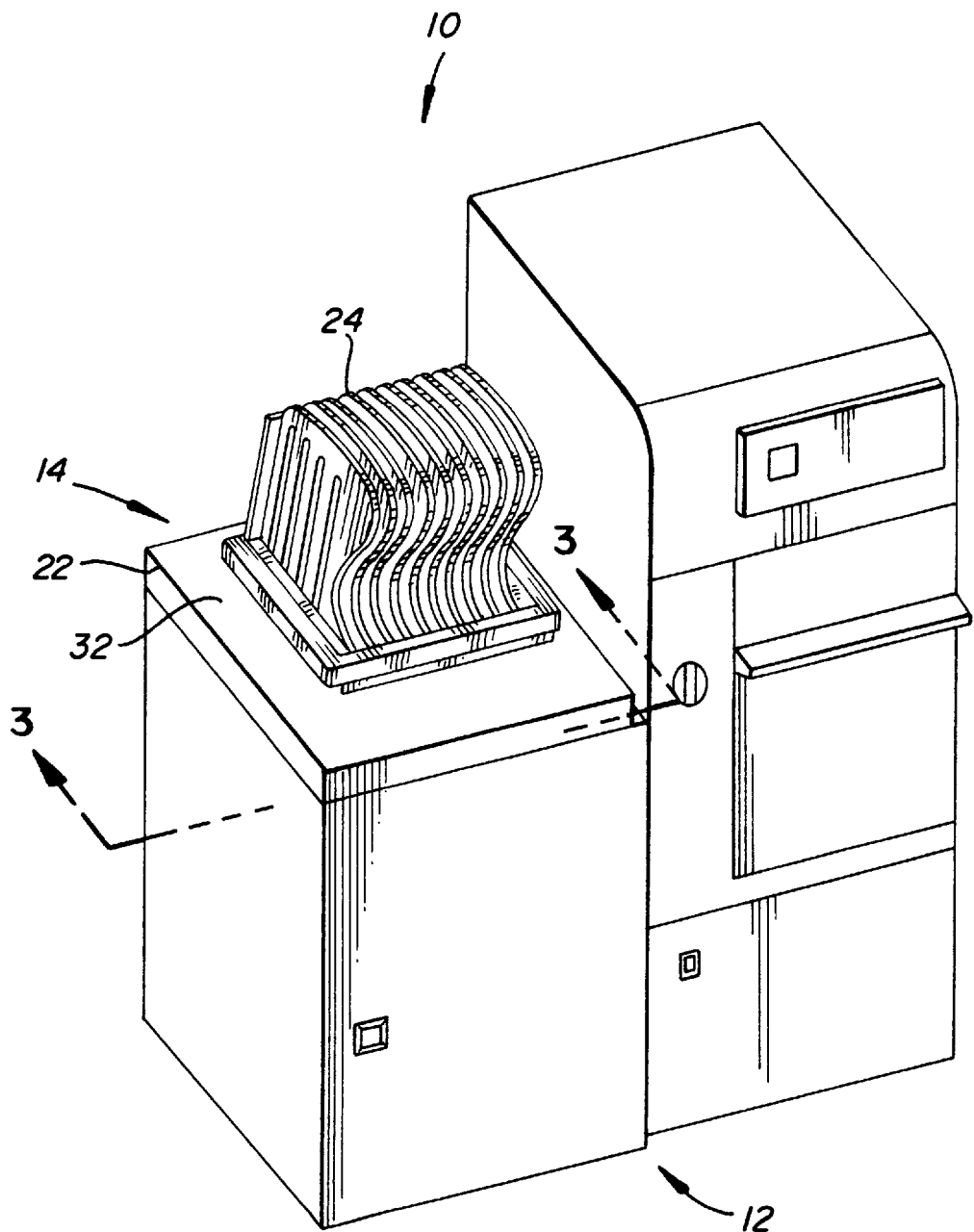
FIG. 1 is a perspective view of the sorting and processing apparatus of the invention, which includes the sorting apparatus of the invention.
Figure 2:
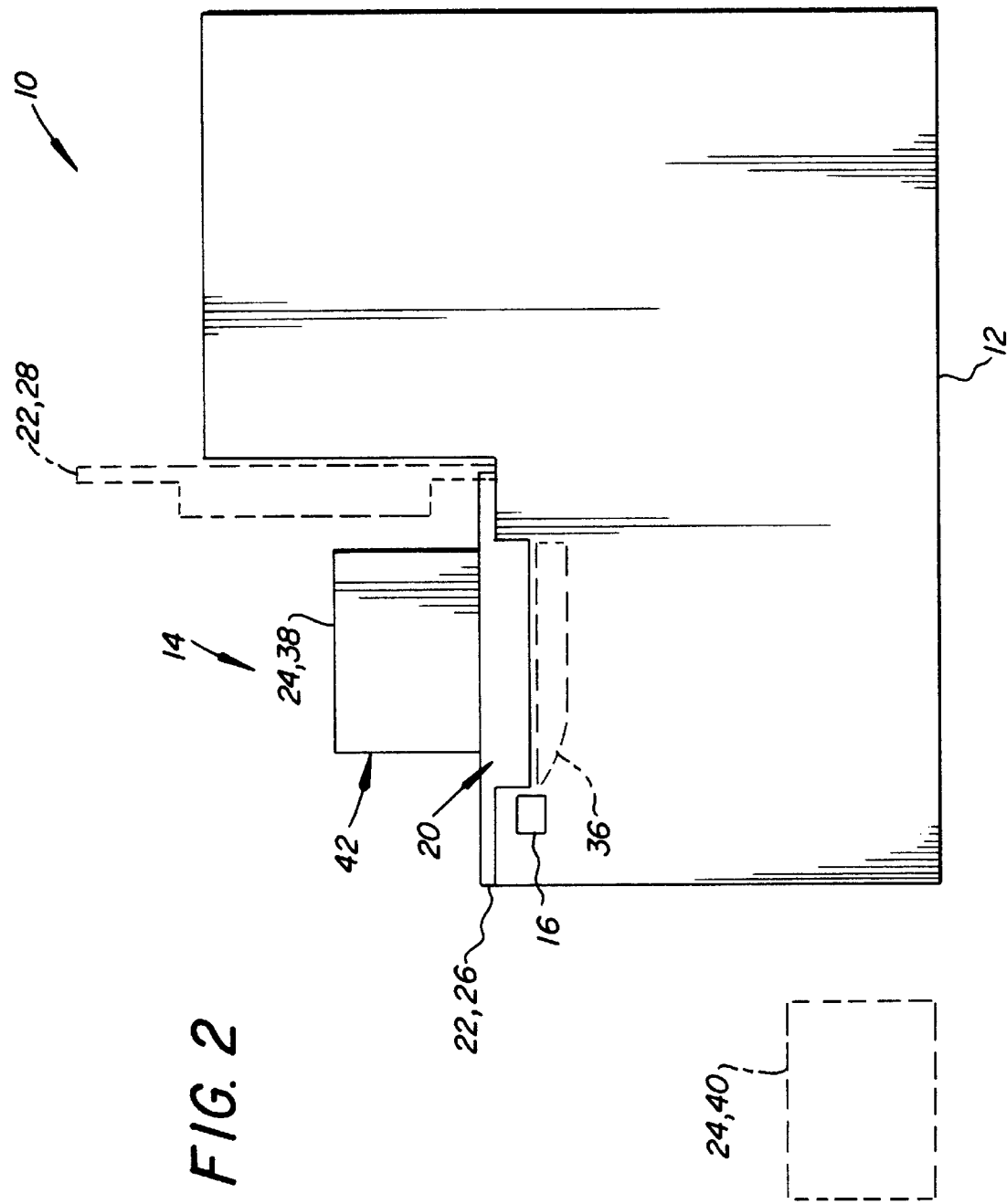
FIG. 2 is a side plan view of the sorting and processing apparatus of FIG. 1. The body of the sorting apparatus is shown in solid lines in a closed position and in dashed lines in an open position. The partition member of the sorting apparatus is shown in an operative position in solid lines and in a displaced position in dashed lines.
Figure 3:
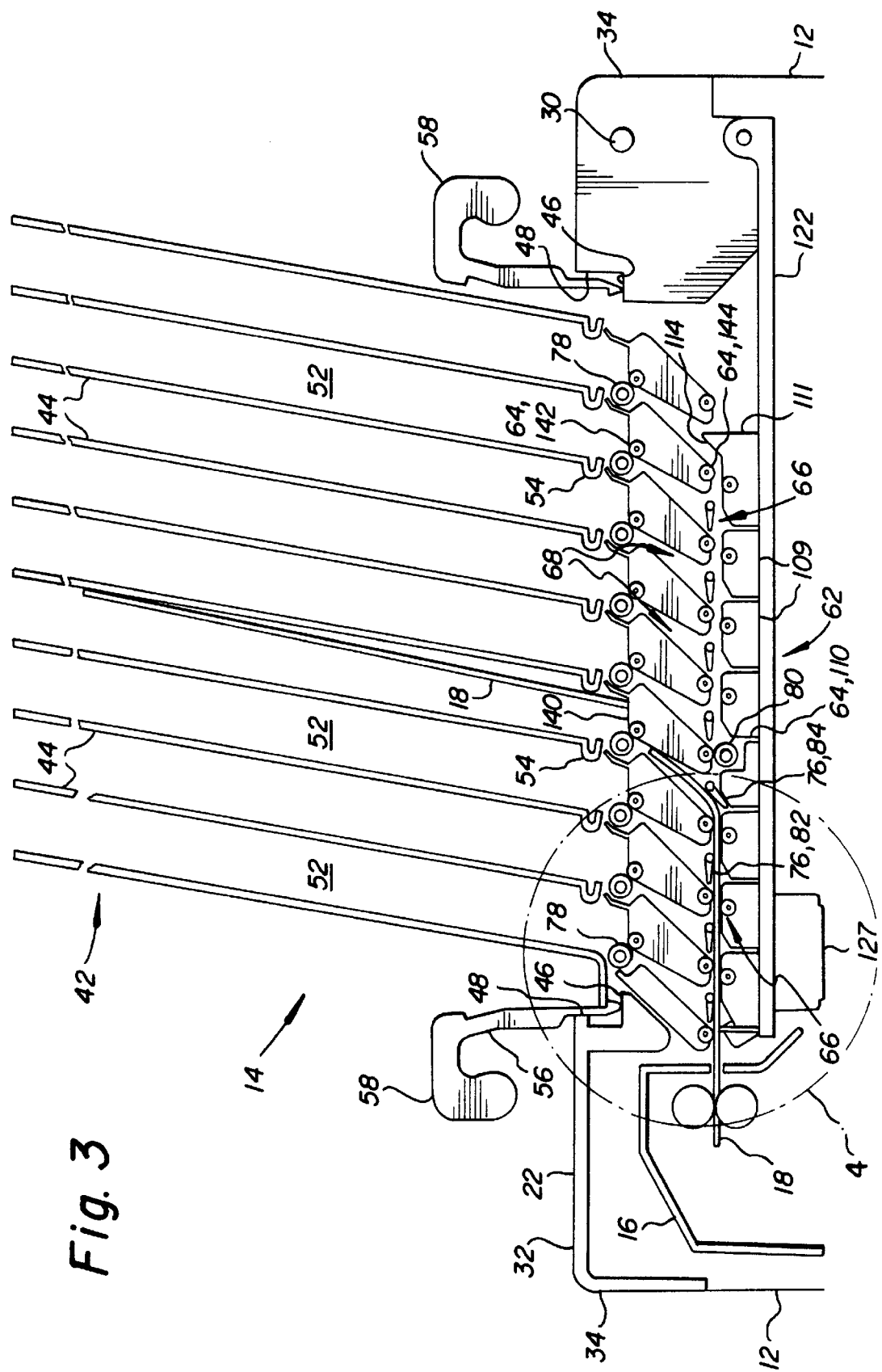
FIG. 3 is a cross-sectional view of the sorting apparatus and a portion of the processor of FIG. 1 taken substantially along line 3—3 in FIG. 1.

Referring now to FIGS. 1 and 2, there will be described in greater detail an exemplary image reproduction system incorporating the present invention. The sorting and processing apparatus 10 includes a processor 12 and the sorting apparatus 14. The processor 12 is a conventional media sheet processor, such as an electrophotographic copier or an X-ray film processor. For example, processor 12 is an X-ray film processor, such as a Kodak X-OMAT 180LP Processor, docked to a laser printer, such as a Kodak Ektascan 2180 Laser Printer. Referring now to FIGS. 1–3, processor 12 has a top discharge 16 that delivers processed media sheets 18 and a service opening 20 adjoining the discharge 16.

The sorting apparatus 14 has a body 22 and a partition member 24. The body 22 is mounted for use on the processor 12 and receives media sheets 18 from the discharge 16 of the processor 12. The body 22 is movable between a closed position 26, shown in solid lines in FIG. 2, and an open position 28, shown in dashed lines in FIG. 2. In the closed position 26, the body 22 is disposed on the processor 12 and acts as a door over the service opening 20 of the processor 12. In the open position 28, the body 22 is displaced from the processor 12 and clear of the service opening 20. Access is then available to the discharge 16 and other parts of the processor 12. Body 22 is hinged to the processor 12 and pivot, about an axis of rotation 30, (shown in FIG. 3) between open and closed positions 28,26. Body 22 has an upper surface 32 that is substantially radial to the axis of rotation 30.

The body 22 includes a carcass 34 which holds other components in position and is configured so as to meet the requirements of a particular use.

Sorting apparatus 14 can optionally include, in addition to body 22 and partition member 24, a default tray 36 (indicated by dashed lines in FIG. 2) mounted in processor 12 so as to receive media sheets delivered by the discharge 16 when the sorting apparatus body 22 is in the open position 28. Default tray 36 can be suspended in processor 12 and can lift out for processor servicing.

The partition member 24 is mounted on the body 22 and is movable, independent of the body 22, between an operative position 38, shown in solid lines in FIG. 2, and a displaced position 40, shown in dashed lines in FIG. 2. In the operative position 38, the partition member 24 is in operative relation to the body 22 and occupies a particular area of space relative to the body 22, which is referred to herein as a "zone of obstruction 42". The zone of obstruction 42 identifies how close another object can approach the upper surface 32 of the body 22, absent the removal of partitions 44. In the displaced position 40, the partitions 44 are completely, or at least substantially removed from the zone of obstruction 42. This permits use of the sorting apparatus 14 in applications where space is limited. Partition member 24 preferably is a unitary assembly which, in the displaced position 40, is lifted from the body 22 and placed on the floor or some other convenient support.

Figure 4:
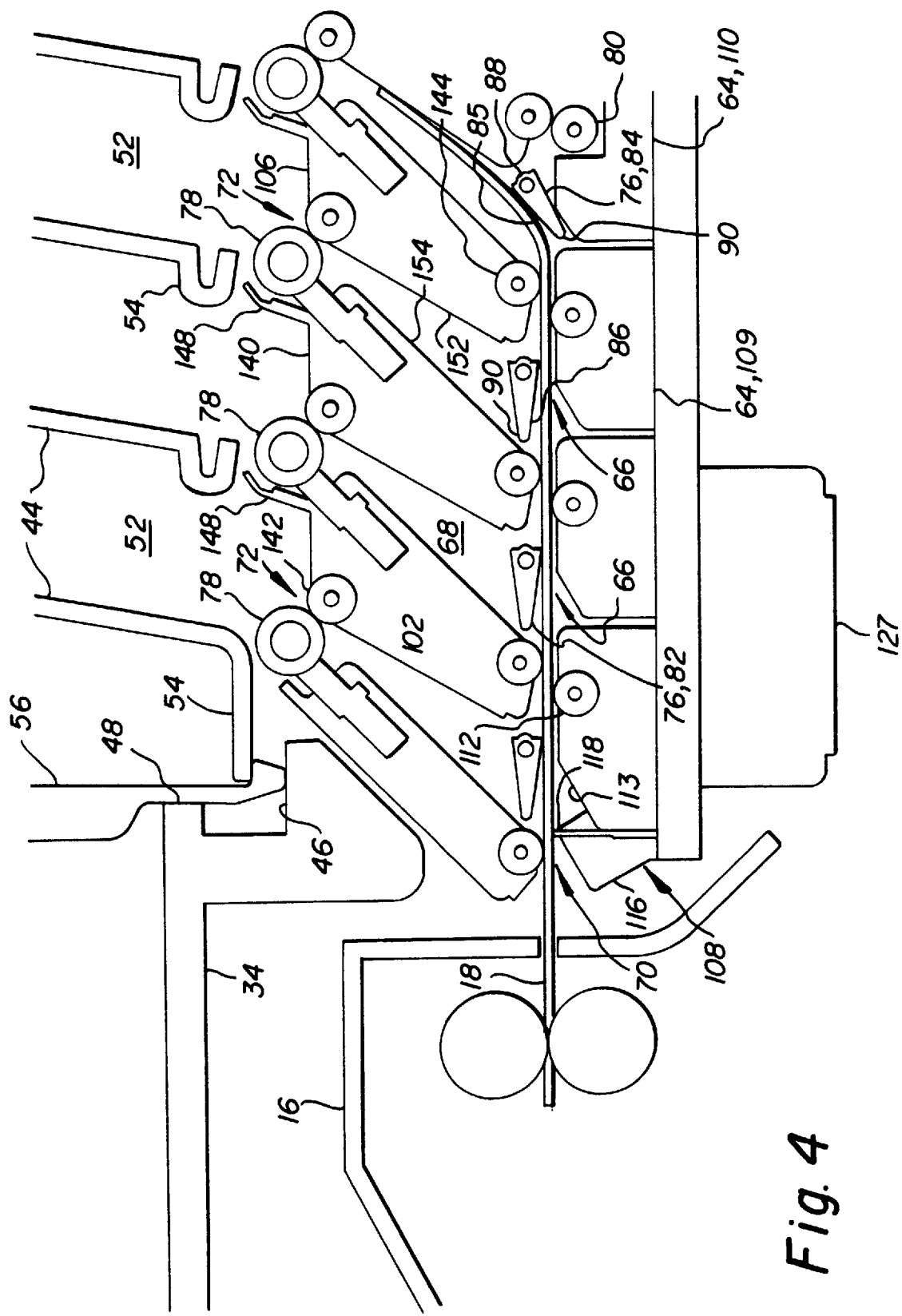
FIG. 4 is enlarged cross-sectional view of the sorting apparatus of FIG. 2 showing the portion indicated by circle 4 in FIG. 3.
Figure 5:
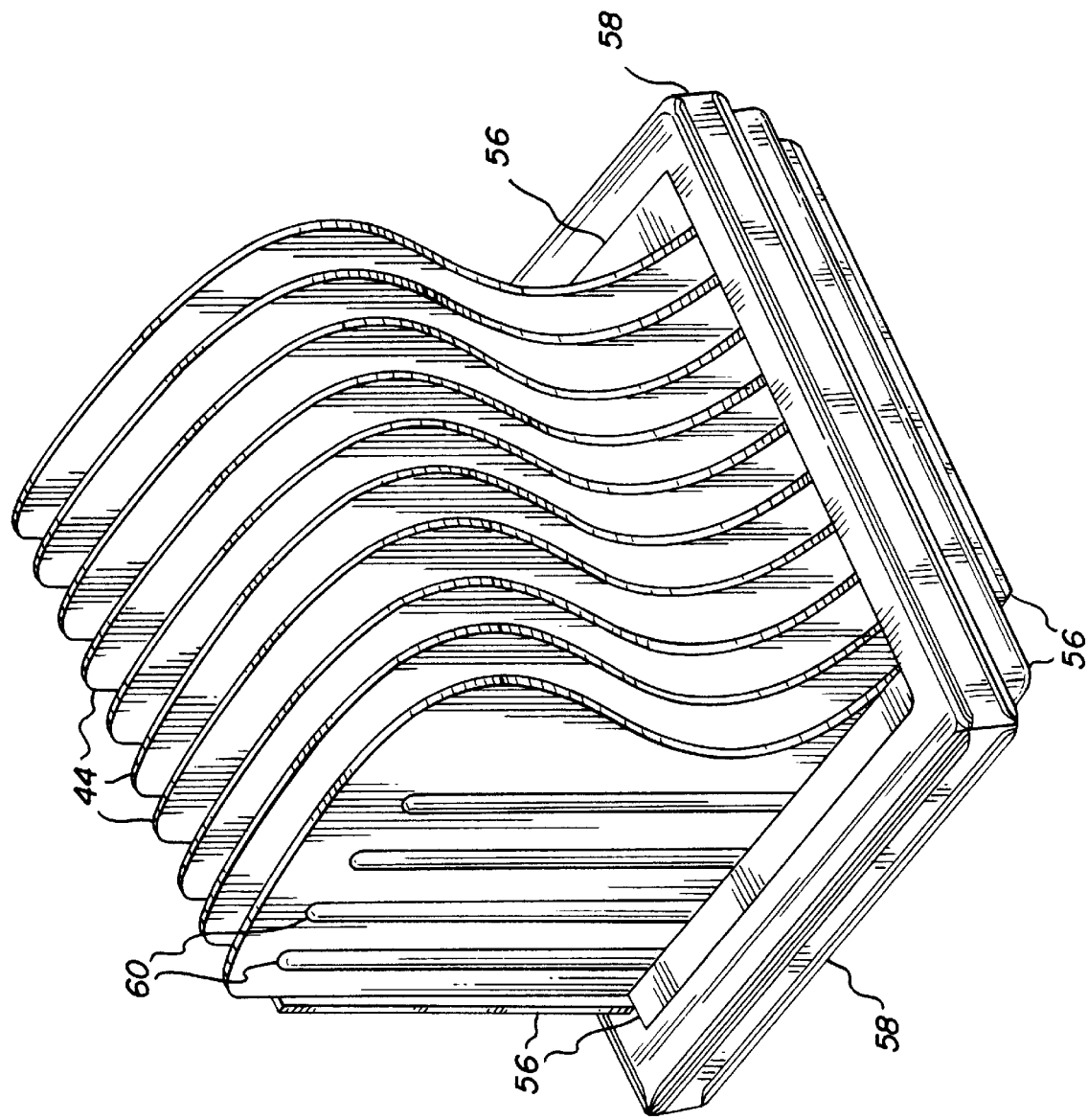
FIG. 5 is a perspective view of the partition member of the sorting apparatus of FIG. 1.

Referring now to FIGS. 3–4, the partition member 24, in the operative position 38, rests on a seat 46 formed in the upper surface 32 of body 22. Lateral movement of partition member 24 is limited by stops 48, but partition member 24 is freely movable in a vertical direction.

Referring now principally to FIGS. 1, 3–4, and 5, the partition member 24 includes a unitary array of parallel partitions 44 that extend outward from the body 22, when the partition member 24 is in the operative position 38. Partitions 44 have no bottom surface and the partitions 44 in combination with the body 22 form a series of bins 52 into which media sheets 18 are distributed. The partition member 24 is easily and quickly removed from operative position 38, even when bins 52 are filled with a heavy load of x-ray films. Partitions 44 have a media protector or guard 54 lowermost. Media guards 54 are discussed below in greater detail.

Partitions 44 are held in place by a frame 56. Partition member 24 can have an integral handle 58. Handle 58 extends continuously around all four sides of partition member 24 and is itself continuous with frame 56. Handle 58 adds strength and rigidity to partition member 24 and in addition allows partition member 24 to be easily gripped by a person standing anywhere within reach of partition member 24. Stiffening welts 60 can be used to reduce weight.

Referring now particularly to FIGS. 3 and 4, a sorter mechanism 62 is disposed substantially within the body 22 of sorting apparatus 14. The sorter mechanism 62 has sheet guides 64 which define a primary passage 66 and a series of secondary passages 68 individually branching from the primary passage 66. In addition to the guides 64 that are discussed, other guides can be provided as needed to assure unhindered movement of media sheet through the sorting apparatus 14. The primary passage 66 has an entrance 70 aligned with the discharge 16 of the processor 12. The secondary passages 68 each have an exit 72 that adjoins one of the bins 52.

The sorter mechanism 62 has a transport system that, in cooperation with the sheet guides 64, propels the media sheets 18 into the bins 52. The transport system provides enough motive force to move the media sheets 18 through the primary passage 66 and selected secondary passages 68 and includes deflectors 76, to allow sorting by a variety of selection criteria. Sheet guides 64 reduce friction and direct media sheets 18 as needed to allow easy movement of the media sheets 18 through the passages 66,68.

Discharge 16 is preferably powered and propels media sheets 18 into primary passage 66. An upper drive 78 in each secondary passage 68 propels media sheets 18 out into bins 52. Depending upon the number of bins 52, the capabilities of discharge 16, and the relative lengths of media sheets 18 and primary passage 66; one or more lower drives 80 may also be provided in primary passage 66.

Referring now to FIGS. 3 and 4, each deflector 76 adjoins the primary passage 66 and an individual secondary passage 68 and is movable between a bypass position 82 and a deflection position 84. In the bypass position 82, the deflector 76 borders the primary passage 66 and blocks the adjoining secondary passage 68. In the deflection position 84, the deflector 76 blocks the primary passage 66 and borders the adjoining secondary passage 68. When the deflector 76 is in the bypass position 82, the deflector 76 directs the media sheet 18 along the primary passage 66 past the blocked secondary passage 68. When the deflector 76 is in the deflection position 84, the deflector 76 directs the media sheet 18 from the blocked primary passage 66 into the selected secondary passage 68. Deflectors 76 are preferably shaped like laterally elongated paddles, with opposed flattened faces 85,86. Each deflector 76 is pivoted about an axis at the deflector's wider end 88. In the bypass position 82, one face 86 of a deflector 76 is aligned with the primary passage 66. In the deflection position 84, the opposite face 85 forms a ramp from the primary passage 66 into the associated secondary passage 68. The upstream end 90 of each deflector 76 is preferably outside of primary passage 66 in both the bypass position 82 and the deflection position 84. This reduces the possibility of media jams, since the leading edge of the media sheet 18 is unlikely to erroneously engage the upstream end 90 of deflector 76.

The deflectors 76 are individually and selectively movable between bypass and deflection positions 82,84. Motive force for the movement may be provided by any of a variety of actuators 92 (indicated diagrammatically in FIG. 6) well known to those skilled in the art. For example, individual deflectors 76 could each be directly or indirectly connected to an individual stepper motor or solenoid.

Figure 6:
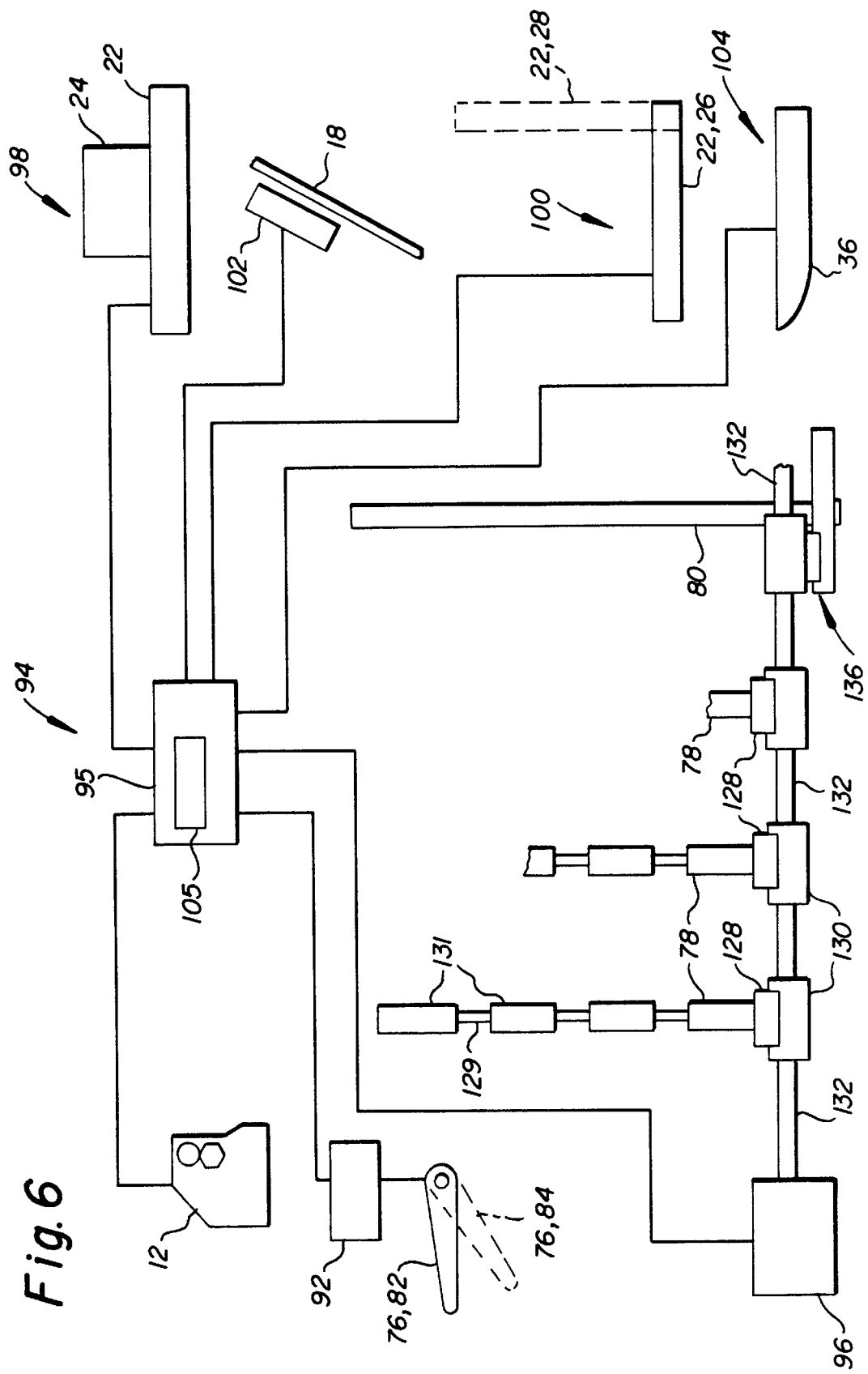
FIG. 6 is diagrammatical view of the control system and controlled components of the sorting apparatus of FIG. 1.

Actuators 92 are controlled by a control system 94 (indicated diagrammatically in FIG. 6). Suitable control systems 94 can take a wide variety of forms and can be, for example, mechanical, mechanical-electrical, or can be analog or digital electronic. For reasons of cost and flexibility of use, digital electronic control systems using microprocessors are preferred. Suitable systems are well known to those skilled in the art. In a particular embodiment of the invention, shown diagrammatically in FIG. 6, a microprocessor control system 94 uses, for example, a Model MC 68 HC 11 microprocessor from Motorola, Inc. of Austin, Tex. as a controller 95. In addition to controlling the positions of the deflectors 76, the controller 95 receives a synchronization signal from the processor 12, which is used to synchronize a motor 96 that powers the upper and lower drives 78,80. The control system 94 can also monitor switches or the like. Examples of such elements are symbolized in FIG. 6 by elements 98, 100, and 104 and by sensor 102. Switch 98 signals if partition member 24 is in operative position 38. Switch 100 signals if body 22 is in open or closed position 28,26. Sensor 102 signals when a media sheet 18 is detected. Switch 104 signals if default tray is in position.

The signals to control system 94 from sensors 102 monitor the presence of media sheets 18 in secondary passages 68. The sensors 102 can track both current sorting status and the occurrence of any jam in the secondary passages 68. If desired, the control system 94 can include a liquid crystal display or other display 105 which can present information to the user, such as the size of films 18 sorted to each bin 52 and the occurrence of jams. Suitable components for the control system 94 are well known to those skilled in the art. Sensors 102 are preferably electro-optical or other non-mechanical type; however, mechanical sensors, such as those based upon a follower mechanism, could also be used.

The bottom guide assembly 108 is disposed at the bottom of body 22 and includes three types of bottom guide units 109,110,111. Each bottom guide unit 109,110,111 provides an offset from the bottom of body 22. First bottom guide units 109 have a low friction upper end 112, which can include one or more rollers or other friction reducing structures. An upstream corner 113 of each first bottom guide 109 is chamfered to provide clearance for a respective deflector 76 in deflection position 84. The remainder of first bottom guide 109 is shaped as convenient. A second bottom guide 110 differs from first bottom guide 109 only in having a recess to accommodate the lower drive 80. A third bottom guide 111 resembles first bottom guide 109 except that the upper surface includes a final ramp portion 114 which takes the place of a deflector 76 in the deflection position. Third bottom guide 111 is mounted farthest downstream of the bottom guides 109,110,111 and sheets 18 are directed by final ramp portion 114 into the last bin 52. In this embodiment of the invention, primary passage 66 ends at third bottom guide 111. Primary passage 66 could alternatively extend onward in some manner, in which case, third bottom guide 111 would be deleted in favor of a first bottom guide 109 and a deflector 76.

Bottom guide assembly 108 preferably includes an entry bottom guide unit 116 which is shaped so as encourage media sheets 18 toward primary passage 66. Entry bottom guide unit 116 can include a conductive brush or the like to help control static charge on the media sheets 18.

Referring now to FIGS. 3 and 6, the upper drives 78 comprise an array of driven rollers disposed along the body 22 slightly below upper surface 32. Upper drives 78 each have an axle 129 that extends the width of body 22. Axle 129 is fitted with a series of pucks 131 separated by gaps. Each axle 129 and its pucks 131 is positively driven by a pinion 128 at one end. Pinions 128 are mated to worm gears 130 borne by a driveshaft 132, which is driven by motor or other power source 96. Driveshaft 132 can also operate a gear train 136 meshed to lower drive 80. Upper drives 78 could also be driven by belts or other means. Upper drives 78 could also be a continuous roller or a series of separated rollers driven in synchrony by mechanical or electronic means. Lower drive can be varied in the same manner.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

Parts list
sorting and processing apparatus 10
processor 12
sorting apparatus 14
discharge 16
media sheets 18
service opening 20
body 22
partition member 24
closed position 26
open position 28
axis of rotation 30
upper surface 32
carcass 34
default tray 36
operative position 38
displaced position 40
zone of obstruction 42
partitions 44
seat 46
stops 48
bins 52
media guards 54
frame 56
handle 58
stiffening welts 60
sorter mechanism 62
sheet guides 64
primary passage 66
secondary passages 68
entrance 70
exit 72
deflectors 76
upper drive 78
lower drive 80
bypass position 82
deflection position 84
faces of deflector 85,86
wider end of deflector 88
upstream end of deflector 90
actuators 92
control system 94
controller 95
motor 96
switches 98,100, 104
sensors 102
display 105
guide modules 106
bottom guide assembly 108
bottom guide units 109,110,111
upper end 112
corner 113
final ramp portion 114
entry bottom guide unit 116
conductive brush 118
access opening 120
hatch 122
first position 124
second position 126
handgrip 127
pinion 128
axle 129
worm gears 130
pucks 131
driveshaft 132
gear train 136
shell 138
sheet support 140
upper guide 142
lower guides 144
guide block 146
media guard 148
trailing surface 150
first surface 152
second surface 154
lower surface 156
digital image reproduction system 200
image sources 202,204,206
printer 208
radiographic film processor 210
operator interface and control 212
implementation boxes 220,228,230,234,236,238
decision diamonds 222,224,226,232

What is claimed is:

1. A digital image reproduction system comprising:

a plurality of sources of digital images;

a printer connected to said plurality of sources for reproducing digital images on media sheets;

a sorter connected to said printer, said sorter having a plurality of selectable storage locations for storing media sheets output from said printer;

an operator interface connected to said printer and said sorter for selectively assigning two or more storage locations of said sorter for storing media sheets reproducing images from one of said image sources; and a control for controlling said sorter to switch from one of said assigned sorter storage locations to another of said assigned sorter storage locations when said one sorter storage location is full or when a predetermined number of media sheets have been placed into said one storage location.

2. The system of claim 1 wherein said plurality of sources are sources of medical images.

3. The system of claim 2 wherein said plurality of sources of medical images are sources of radiographic images.

4. The system of claim 1 wherein said printer is a laser printer for reproducing said digital images on a processor connected so said laser printer and said sorter for processing said film output by said laser printer and for transporting processed film to said sorter.

* * * * *